United States Patent [19]

Kubiatowicz

[11] 4,240,525
[45] Dec. 23, 1980

[54] TOY TIMING DEVICE WITH A SLIP-STICK ESCAPEMENT-LIKE MECHANISM

[75] Inventor: James F. Kubiatowicz, Minneapolis, Minn.

[73] Assignee: Custom Concepts, Incorporated, Minneapolis, Minn.

[21] Appl. No.: 9,939

[22] Filed: Feb. 7, 1979

Related U.S. Application Data

[62] Division of Ser. No. 806,855, Jun. 15, 1977, Pat. No. 4,154,054.

[51] Int. Cl.² ............................................. F03G 1/04
[52] U.S. Cl. ........................................ 185/38; 368/45; 368/147; 368/197; 185/37; 185/DIG. 1; 188/83; 188/85
[58] Field of Search .................. 58/2, 106, 21, 13, 48; 188/83, 85, 268; 74/1.5, 3.5; 185/37, 38, 45, DIG. 1

[56] References Cited

U.S. PATENT DOCUMENTS

| | | | |
|---|---|---|---|
| 2,667,738 | 2/1954 | Eichholz | 58/106 |
| 2,833,347 | 5/1958 | Terry | 188/268 X |
| 3,638,682 | 2/1972 | Heyer | 74/3.5 X |
| 3,688,626 | 9/1972 | Cotey | 185/38 X |

*Primary Examiner*—Allan D. Herrmann
*Attorney, Agent, or Firm*—William L. Huebsch

[57] ABSTRACT

A toy timing device including an escapement-like mechanism regulating the movement of a movable portion toward a position on a housing toward which it is biased by the alternate slipping and sticking of parts of a rubber band extending over ribs on the movable portion as the rubber band parts move along a continuous surface on the housing.

5 Claims, 6 Drawing Figures

U.S. Patent   Dec. 23, 1980   4,240,525
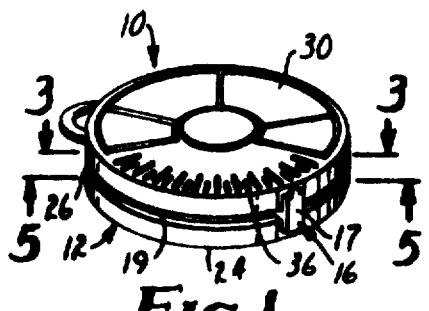
FIG. 1
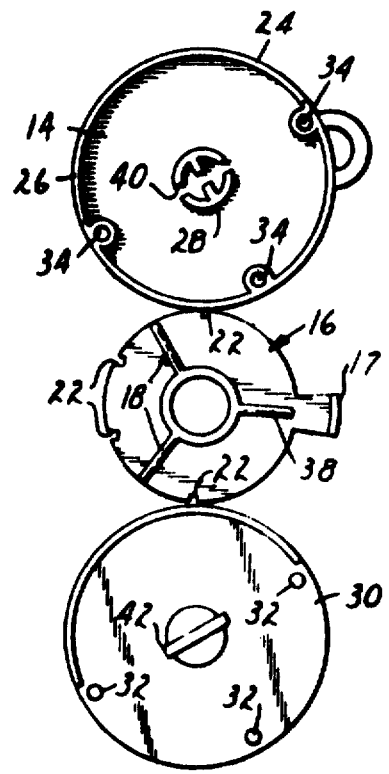
FIG. 2
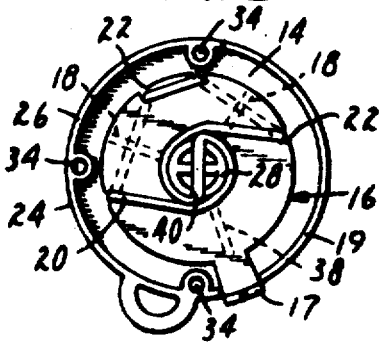
FIG. 3
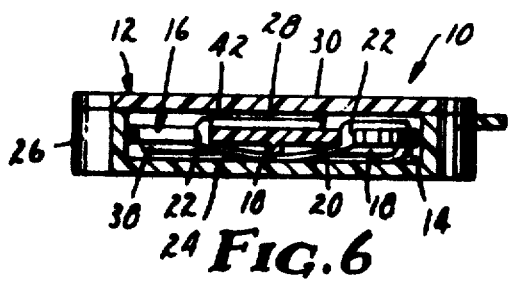
FIG. 6
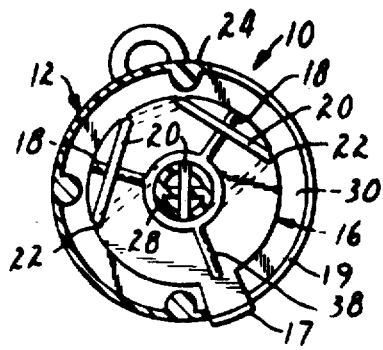
FIG. 4
FIG. 5

TOY TIMING DEVICE WITH A SLIP-STICK ESCAPEMENT-LIKE MECHANISM

This is a division of application Ser. No. 806,855 filed June 15, 1977, now U.S. Pat. No. 4,154,054.

BACKGROUND OF THE INVENTION

This invention relates to escapement-like mechanisms for regulating the movement of a movable member to a position on a housing toward which it is biased, and in one aspect to such mechanisms used in toy timing devices.

Many mechanical escapements are known for regulating the movement of a movable member toward a position to which it is biased. Most of such mechanisms, however, contain many moving parts and thus are too expensive for use in inexpensive toys such as are used as premiums in boxes of cereal.

SUMMARY OF THE INVENTION

The present invention provides a simple escapement-like mechanism which may be used to regulate movement of a member toward a position on a device toward which the member is biased, which mechanism can be made so inexpensively that it may be used in a toy provided as a premium in a box of cereal.

According to the present invention there is provided an escapement-like mechanism comprising a first member having a continuous surface, a second member mounted on the first member to afford relative movement of the members between first and second relative positions, and means for biasing the members toward their first relative position. The second member includes a projection which stays in closely spaced relationship with respect to the surface as relative movement of the members occurs. A length of resiliently elastic material is mounted on the second member in a position generally aligned in the direction of relative movement of the members and extending across the projection. A part of the elastic material is compressed slightly between the projection and the surface on the first member and will alternately slip and then stick along the surface at a high frequency to regulate relative movement of the members from their second to their first relative positions under the influence of the biasing means.

In a preferred embodiment in which the mechanism is included in a toy timing device, the second member is a rotor mounted for rotation about a post on the first member. The rotor may be manually moved to its second position to set the timer, and includes a pointer positioned to move along a dial formed on the first member as the rotor moves toward its first position. The rotor has two projections in the form of radially extending ribs. A common rubber band is lightly tensioned through notches in the edge of the rotor with portions extending transverse of (but not attached to) the ribs to provide a part of the rubber band between each rib and the surface that will alternately stick and slip along the surface to regulate the speed of rotation for the rotor. In this embodiment a portion of the rubber band also extends between notches on opposite sides of the rotor through a radial groove in the end of the post and is wound partially around the post to provide the means for biasing the rotor to its first position. The alternate sticking and slipping of the rubber band as the rotor moves to its first position provides an audible vibration in the device which simulates ticking and thus adds to the pleasure of playing with the timing device.

BRIEF DESCRIPTION OF THE DRAWING

The invention will be further described with reference to the accompanying drawing wherein like numbers refer to like parts in the several views, and wherein:

FIG. 1 is a perspective view of a timing toy including an escapement-like mechanism according to the present invention;

FIG. 2 is a plan view of a molding providing three of the parts of the timing toy of FIG. 1;

FIG. 3 is a sectional view taken approximately along lines 3—3 of FIG. 1 with a cover portion of the toy removed, and which shows a rotor in the toy in its first position;

FIG. 4 is a sectional view taken approximately along lines 3—3 of FIG. 1 with the cover portion removed but shown with the rotor in its second position;

FIG. 5 is a sectional view taken approximately along lines 5—5 of FIG. 1; and

FIG. 6 is a sectional view taken approximately along lines 6—6 of FIG. 3 with the cover portion in place.

DESCRIPTION OF THE PREFERRED EMBODIMENT

Referring now to the drawing there is shown a toy timing device including an excapement-like mechanism according to the present invention generally designated by the numeral 10.

Briefy, the device 10 comprises a first member or housing 12 including a wall having a continuous generally planar surface 14; a second member or rotor 16 mounted on the housing 12 to afford relative movement of the members 12 and 16 between a first relative position (FIG. 3) and a second relative position (FIG. 4), which in this embodiment is provided by movement of the rotor 16 between first and second positions relative to the housing 12 established by engagement of a projecting pointer 17 on the rotor 16 with the ends of a slot 19 for the pointer 17 defined by the housing 12; and means for biasing the members 12 and 16 to their first relative position. The rotor 16 includes two radially extending ribs 18 which move in closely spaced relationship along the surface 14 as the rotor 16 moves between its first and second positions. A length of resiliently elastic material provided by a common rubber band 20 is lightly stretched around the periphery of the rotor 16 through notches 22 in its periphery with a different portion of the rubber band 20 extending transverse of each of the ribs 18 generally in alignment with the direction of movement of the ribs 18. Parts of the rubber band 20 are slightly compressed between the ribs 18 and the surface 14 so that these parts will repetitively stick and slip along the surface 14 at a rapid and audible frequency to regulate movement of the rotor 16 to its first position under the influence of the biasing means.

The housing 12 is a two piece assembly comprising a base piece 24 including the circular wall with the surface 14, a generally cylindrical rim 26 projecting from the periphery of the wall, and a cylindrical post 28 coaxial with the wall and rim 26 and projecting from the surface 14, about which post 28 the rotor 16 is rotatably mounted. The housing 12 also includes a circular cover piece 30 having three spaced projections 32 frictionally engaging openings 34 (FIG. 2) in the rim 26 to retain the cover piece 30 coaxial with the base piece 24. The cover piece 30 has spaced markings 36 molded in its outer surface along the slot 19 to provide a dial along which the pointer 17 moves as the rotor 16 moves between its first and second positions.

The rotor 16 includes a generally circular portion with a central opening through which the post 28 is positioned, the pointer 17 which projects from one edge of the circular portion through the slot 19, the radially extending ribs 18 which project toward the surface 14 of the base piece 24, and a rib 38 which extends parallel to the pointer and provides, if necessary, a third bearing point for the rotor 16 on the surface 14.

The means for biasing the rotor 16 toward its second position comprises two of the notches 22 in the periphery of the rotor 16 which are radially opposed. A portion of the rubber band 20 extends between those two opposed notches 22 with its central part extending through a transverse diametrically extending groove 40 in the distal end part of the post 28 and with its parts adjacent its central part partially wrapped around the periphery of the post 28. The parts wrapped around the post 28 become more fully wrapped to further tension that portion of the rubber band and bias the rotor towards its first position as the rotor 16 is moved from its first position (FIG. 3) toward its second position (FIG. 4).

The timing toy 10 also includes means for biasing the rotor 16 toward the surface 14 to compress the parts of the rubber band 20 between the ribs 18 and the surface 14 by a predetermined amount and thereby regulate the rapidity of the slip-stick action of the rubber band 20 against the surface 14. This means is provided by a bar 42 molded on the inner surface of the cover piece 30. The bar 42 extends into and across the groove 40 with its ends extending beyond the post 28 to press the parts of the rubber band adjacent the slot 40 against the rotor 16, and thereby the parts of the rubber band 20 crossing the ribs 18 against the surface 14.

The desired stretching of the rubber band is provided by sizing the rotor and rubber band relative to each other. A rotor 16 having a central portion about 1/16 inch thick, with a diameter of about 1 3/16 inch at the base of the notches 22 and with ribs about 1/16 inch square has been found suitable for use with a standard size No. 8 rubber band which is about 1/16 inch wide and has a length (measured when its side portions are pressed together) of about ⅞ inch.

When the housing 12 is made of styrene (which is a preferred material) it has been found preferable to provide a matte finish on the surface to facilitate the stick-slip action of the rubber band 20.

ASSEMBLY AND OPERATION

As is seen in FIG. 2 the housing pieces 24 and 30 and the rotor 16 may be molded in one piece of a polymeric material such as high impact styrene. To assemble the device 10, the housing pieces 24 and 30 and the rotor 16 are separated and the rubber band 20 is lightly stretched through the notches 22 on the periphery of the rotor 16 so that portions of the rubber band 20 extend transverse of (but are not attached to) the ribs 18 and a portion extends radially of the rotor 16. The part of the rubber band crossing the opening in the rotor 16 is then positioned in the slot 40 in the post 28 with the pointer 17 projecting away from the part of the slot 19 defined on the base piece 24. The rotor 16 is then rotated about 90 degrees to position the pointer 17 in the part of the slot 19 defined on the base piece 24, thereby partially wrapping the rubber band 20 about the post 28, (FIG. 4) and the cover piece 30 is pressed into positions by pressing the projections 32 into the mating openings 34. This positions the bar 42 in the groove 40 to retain the part of the rubber band 20 therein, and lightly presses the parts of the rubber band 20 crossing the ribs 18 against the surface 14. Thereafter, when the pointer 17 is manually moved to its second position and released, the parts of the rubber band crossing the ribs 18 will alternatively slip and stick along the surface 14 regulating the speed of movement of the rotor 16 back to its first position and producing an audible sound similar to ticking in the device 10.

While the speed of movement of the rotor 16 has not been found to be highly predictable or repeatable when the device is driven by a commercially available rubber band 20, times of 20 seconds for the rotor 16 to rotate about 100 degrees are not uncommon so that the slip-stick regulation of the escapement-like mechanism provides a suitable action for devices such as the toy timing device 10. Also this mechanism would be suitable for use in other toys and games where regulated relative movement of parts was desired.

I claim:

1. An escapement-like mechanism comprising:
   a first member including a wall having a continuous surface;
   a second member mounted on said first member to afford relative movement of said members between first and second relative positions, said second member including a projection which stays in closely spaced relationship along said surface during said relative movement;
   means for biasing said members toward said first relative position; and
   a length of elastic resilient material mounted on said second member in a position generally aligned in the direction of relative movement of the members, said length extending across and being unattached to the projection with part of the length of elastic material slightly compressed between the projection and said surface so that the elastic material will intermittently stick and slip against said surface to regulate movement of said members from said second position to said first position under the influence of said biasing means.

2. An escapement-like mechanism according to claim 1, wherein said second member is rotatably mounted on said first member and comprises a radially extending rib adjacent said surface to provide said projection.

3. An escapement-like mechanism according to claim 1, wherein said second member is rotatably mounted on said first member and comprises two angularly spaced radially projecting ribs adjacent said surface providing two of said projections with a different length of elastic material over each rib.

4. An escapement-like mechanism according to claim 3, wherein the lengths of elastic resilient material over said ribs are portions of an annular rubber band lightly tensioned about said second member.

5. An escapement-like mechanism according to claim 4, wherein said first member includes a post having a diametrically extending groove in its distal end, said second member is rotatably mounted about said post, and said rubber band includes a portion extending between diametrically opposed positions on said second member, having a part in said groove, and parts adjacent said groove partially wrapped around said post to provide means for biasing said members toward said first relative position.

* * * * *